Patented Apr. 21, 1953

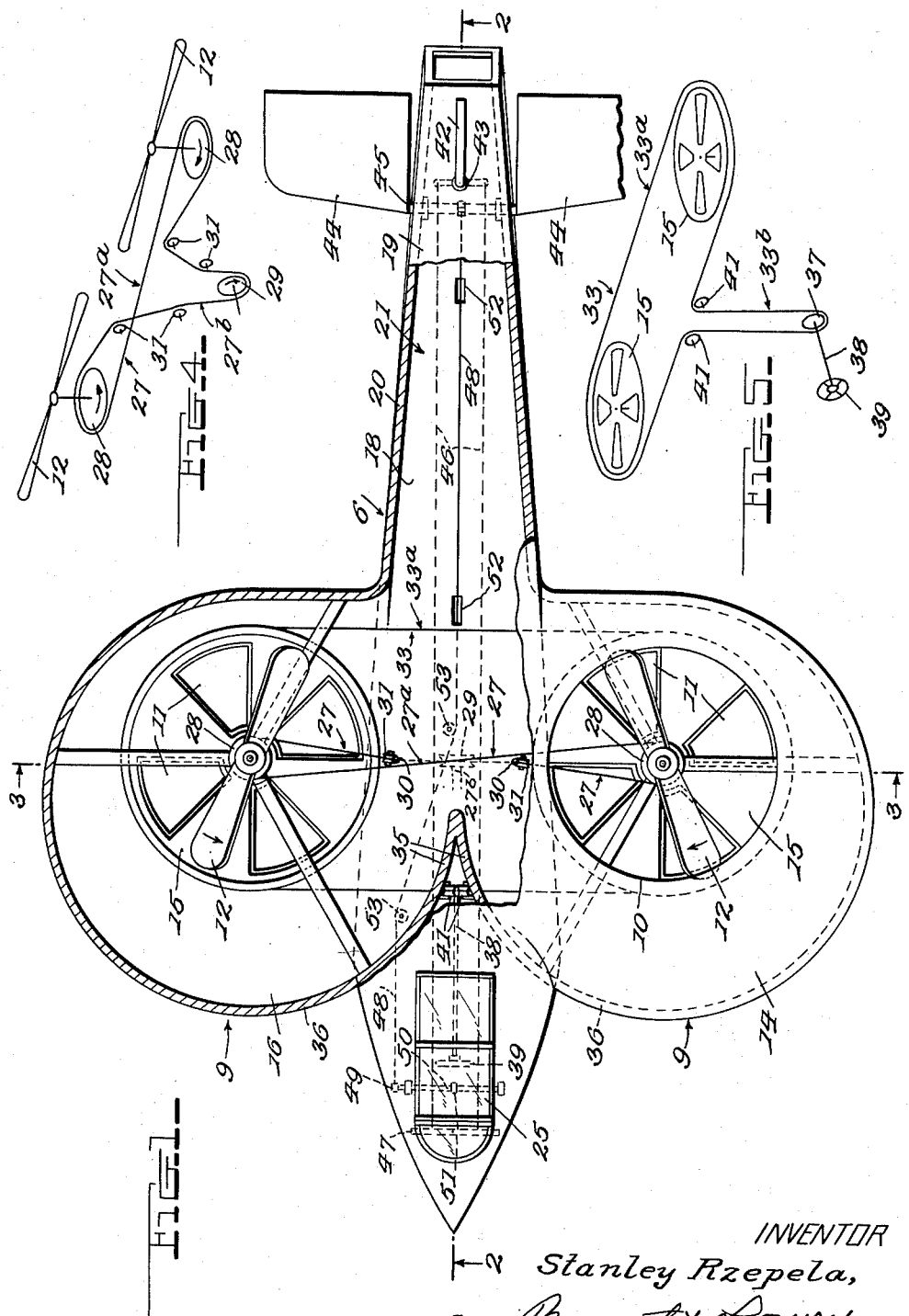

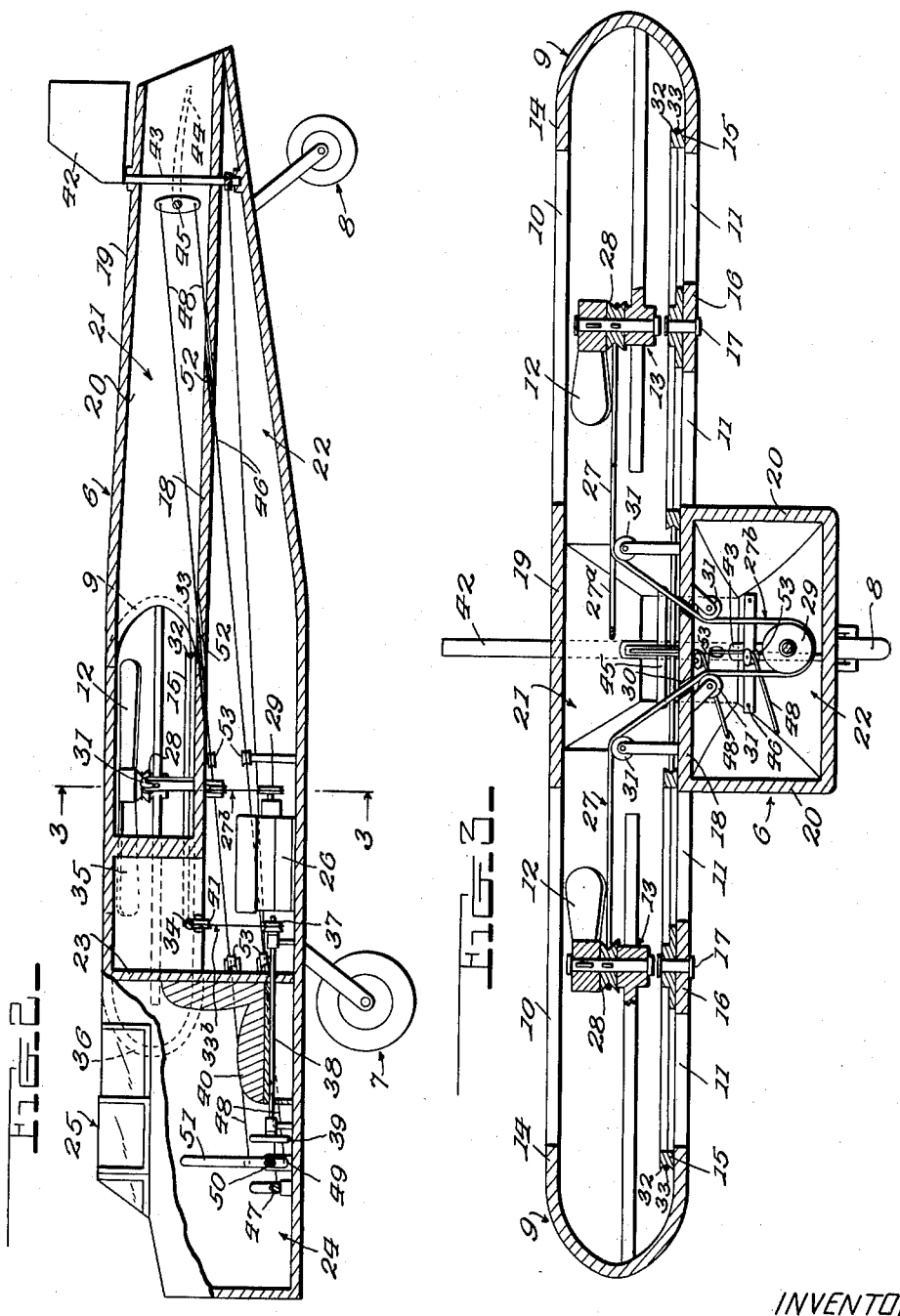

2,635,833

UNITED STATES PATENT OFFICE 2,635,833

FLUID-SUSTAINED AND JET-PROPELLED AIRPLANE

Stanley Rzepela, Philadelphia, Pa.

Application January 30, 1951, Serial No. 208,465

3 Claims. (Cl. 244—12)

This invention relates to a new type of aircraft possessing advantages of both a helicopter and a jet plane.

The principal object of the invention is to provide a novel aircraft requiring no runway or take-off deck and embodying propeller means active first to vertically lift the plane to any desired height and then active to create a rearward jet of air to propel the craft.

Another object is to provide a novel aircraft which does not require that the propeller means be tilted from one plane of operation to another to cause vertical lift and propulsion, respectively.

Still another object is to provide a novel aircraft which does not require an elongated landing strip or deck but may be gently lowered onto a selected landing spot upon a carrier or upon the ground or water.

A further object is to provide a novel aircraft comprising hollow wings with openings in their tops and bottoms, a fuselage having a longitudinal air-jet tunnel in communication with said hollow wings, vertical-axis propellers for drawing air into said hollow wings through the top openings, and valve means for determining whether the inwardly drawn air shall be discharged downwardly through the bottom openings for ascent or descent, or rearwardly through said air-jet tunnel for craft propulsion.

A still further object is to provide novel operating means for the propellers.

Yet another object of the invention is to provide the aforesaid valve means in a novel form and to make advantageous provision for adjusting said valve means as required.

Still another object is the provision of an exceptionally simple yet a highly advantageous structure.

With the above and other objects in view that will become apparent as the nature of the invention is better understood, the same consists in the novel form, combination, and arrangement of parts hereinafter more fully described, shown in the accompanying drawings, and claimed.

In the drawings:

Figure 1 is a top plan view of the craft, partly in horizontal section,

Figure 2 is a vertical longitudinal sectional view on line 2—2 of Figure 1,

Figure 3 is an enlarged transverse sectional view on line 3—3 of Figure 1,

Figure 4 is a diagram showing the propeller driving means, and

Figure 5 is a diagram showing the valve adjusting means.

The construction shown in the drawings will be rather specifically described but it is to be understood at the outset that the present disclosure is to a large extent illustrative rather than limiting.

A fuselage 6 is provided having a suitable fore and aft landing gear 7 and 8 which may be designated for landing upon a solid surface or upon water. Two hollow substantially circular wings 9 project laterally from the fuselage 7, and each wing has a large circular opening 10 in its top and a plurality of segmental openings 11 in its bottom. The opening 10 of each wing is preferably rearwardly eccentric to the wing, and the segmental openings 11 are spaced around a point vertically alined with the center of said opening 10. Two vertical-axis propellers 12 are suitably mounted at 13 in the wings 9 respectively, in alinement with the openings 10 and directly under the tops 14 of said wings. Two circular segmentally-apertured valve disks 15 lie upon the wing bottoms 16 to close or open the segmental openings 11, either partially or wholly, said valve disks being centrally pivoted at 17 to said wing bottoms 16.

A longitudinal substantially horizontal partition 18 is provided in the fuselage 6, said partition cooperating with the fuselage top 19 and side walls 20 in forming an air-jet tunnel 21. The front end of this tunnel 21 is in communication with the hollow wings 9, and the tunnel and wing bottoms are preferably in the same plane in the region of this communication. The rear end of the tunnel 21 is open. The space 22 under the partition 18 forwardly terminates at a transverse vertical partition 23, and in advance of this partition 23 there is a cockpit 24 with suitable transparent cowling 25. The space 22 accommodates the motor or motors, and also constitutes carrying space for cargo, ammunition, etc.

A single motor 26 is shown for driving both propellers 12 in the directions indicated by the arrows in Figure 1 and it is preferable to employ a belt-and-pulley drive from said motor to said propellers, the belt being preferably a cable. This belt or cable is shown at 27 trained around pulleys 28 of the propellers 12 and around a motor-driven pulley 29. The belt or cable 27 has two crossed reaches, one of said reaches 27a being straight and located above the wing bottoms, while the other reach has a downward U-shaped loop 27b extending through openings 30 in the partition 18 and engaged with the drive pulley 29, suitable guide sheaves 31 being provided for said loop 27b. The two propellers 12 may thus be smoothly driven with little friction loss and little wear on driving parts.

While any desired means may be employed for adjusting the valve disks 15, these disks are shown to be peripherally grooved at 32 and engaged with a belt or cable 33. One reach 33ª of this belt or cable is straight and disposed superjacent to the wing bottoms, while the other reach is provided with a downward U-shaped loop 33ᵇ which extends through openings 34 in the meeting portions 35 of the front wing edge walls 36, said loop 33ᵇ being engaged with a pulley 37 on a longitudinal shaft 38, said shaft 38 having a hand wheel 39 near the pilot's seat 40. Suitable guide sheaves 41 are provided for the loop 33ᵇ. There is thus provided a simple and practical means, permitting the pilot to easily adjust the valve disks 15 at will.

Suitable rudders are provided. There is shown a vertical rudder 42 on a shaft 43, and horizontal rudders 44 on a shaft 45. Operating cables 46 for the shaft 43 extend forwardly to a foot operated lever 47, and operating cables 48 for the shaft 45 extend forwardly to a cross arm 49 on a shaft 50 to which the "joystick" 51 is connected. The cables 48 pass through slots 52 and over guide sheaves 53 where required.

Operation

By driving the two propellers 12 with the valve disks 15 fully opened, the air drawn into the hollow wings 9 will be downwardly discharged through the openings 11 and vertical lift of the craft will take place. When a desired height has been reached, the pilot operates the hand wheel 39 to close the valve disks 15, with the result that the blasts from the propellers 12 then merge and are forcibly discharged through the tunnel 21, thereby causing air-jet propulsion, the propellers 12 then acting very much like centrifugal pumps. To descend, the valve disks 15 are opened and the propellers slowed to a speed at which they will allow gentle settling of the craft onto any selected spot.

From the foregoing description of the invention, it will be seen that novel and advantageous provision has been disclosed for attaining the desired ends, and while there is herein shown and described the preferred embodiment of the invention, it is nevertheless to be understood that minor changes may be made therein without departing from the spirit and scope of the invention as claimed.

What is claimed, is:

1. An aircraft including a fuselage, two wings projecting laterally from said fuselage, a horizontal partition in the fuselage providing an upper longitudinal rearwardly open air tunnel and a lower motor chamber, said wings being hollow and in communication with said air tunnel, the tops of said wings being apertured for air admission and the bottoms of said wings being apertured for air discharge, two vertical-axis propellers within said hollow wings respectively and pitched to create downward air blasts, means for driving said propellers, valve means for the apertured bottoms of said wings, and operating means for said valve means; whereby upon opening of said valve means the propeller blasts will downwardly escape to cause craft ascent, and upon closing of said valve means said blasts will merge and will be rearwardly discharged through said tunnel to cause air-jet propulsion of the craft.

2. An aircraft including a fuselage, two wings projecting laterally from said fuselage, a horizontal partition in the fuselage providing an upper longitudinal rearwardly open air tunnel and a lower chamber, said wings being hollow and in communication with said air tunnel, the tops of said wings being apertured for air admission and the bottoms of said wings being apertured for air discharge, two vertical-axis propellers within said hollow wings respectively and pitched to create downward air blasts, means for driving said propellers, valve means for the apertured bottoms of said wings, and operating means for said valve means; whereby upon opening of said valve means the propeller blasts will downwardly escape to cause craft ascent, and upon closing of said valve means said blasts will merge and will be rearwardly discharged through said tunnel to cause air-jet propulsion of the craft, said valve means consisting of two peripherally grooved valve disks rotatably mounted on the wing bottoms, said operating means comprising a belt engaged with the grooves of said valve disks, a pulley engaged with said belt for operating this belt to turn said valve disks, and means whereby this pulley may be rotated.

3. An aircraft including a fuselage, two wings projecting laterally from said fuselage, a horizontal partition in the fuselage providing an upper longitudinal rearwardly open air tunnel and a lower chamber, said wings being hollow and in communication with said air tunnel, the tops of said wings being apertured for air admission and the bottoms of said wings being apertured for air admission and the bottoms of said wings being apertured for air discharge, two vertical-axis propellers within said hollow wings respectively and pitched to create downward air blasts, means for driving said propellers, valve means for the apertured bottoms of said wings, and operating means for said valve means; whereby upon opening of said valve means the propeller blasts will downwardly escape to cause craft ascent, and upon closing of said valve means said blasts will merge and will be rearwardly discharged through said tunnel to cause air-jet propulsion of the craft, said valve means consisting of two peripherally grooved valve disks rotatably mounted on the wing bottoms, said operating means comprising a belt engaged with the grooves of said valve disks, a pulley engaged with said belt for operating this belt to turn said valve disks, said pulley being within the fuselage below the wing bottoms, said belt having a downward U-shaped loop engaged with said pulley, guides for said loop, a rotatably mounted shaft upon which said pulley is secured, and a hand wheel on said shaft.

STANLEY RZEPELA.

References Cited in the file of this patent

UNITED STATES PATENTS

| Number | Name | Date |
|---|---|---|
| 960,136 | Wunderlich | May 31, 1910 |
| 1,491,954 | Jacobs | Apr. 29, 1924 |
| 1,769,487 | Boney | July 1, 1930 |
| 1,922,167 | Leray | Aug. 15, 1933 |
| 2,461,435 | Neumann | Feb. 8, 1949 |
| 2,567,392 | Naught | Sept. 11, 1951 |
| 2,568,812 | Lee | Sept. 25, 1951 |